(12) United States Patent
Wood

(10) Patent No.: US 7,977,600 B2
(45) Date of Patent: Jul. 12, 2011

(54) METHODS AND SYSTEMS FOR PROVIDING DIRECT MANUFACTURED INTERCONNECTING ASSEMBLIES

(75) Inventor: Jeffrey H. Wood, Eureka, MO (US)

(73) Assignee: The Boeing Company, Chicago, IL (US)

( * ) Notice: Subject to any disclaimer, the term of this patent is extended or adjusted under 35 U.S.C. 154(b) by 1141 days.

(21) Appl. No.: 11/691,794

(22) Filed: Mar. 27, 2007

(65) Prior Publication Data

US 2008/0241765 A1 Oct. 2, 2008

(51) Int. Cl.
*B23K 26/00* (2006.01)
*F16B 19/00* (2006.01)

(52) U.S. Cl. .................. 219/121.66; 411/510

(58) Field of Classification Search .. 219/121.6–121.86; 411/500–510
See application file for complete search history.

(56) References Cited

U.S. PATENT DOCUMENTS

| | | | |
|---|---|---|---|
| 4,965,027 A | 10/1990 | Takahashi | |
| 5,393,613 A | 2/1995 | MacKay | |
| 5,746,844 A | 5/1998 | Sterett et al. | |
| 5,837,960 A | 11/1998 | Lewis et al. | |
| 5,993,554 A | 11/1999 | Keicher et al. | |
| 6,123,492 A * | 9/2000 | Pickard | 411/508 |
| 6,391,251 B1 | 5/2002 | Keicher et al. | |
| 6,656,409 B1 | 12/2003 | Keicher et al. | |
| 6,811,744 B2 | 11/2004 | Keicher et al. | |
| 2003/0105538 A1 | 6/2003 | Wooten | |
| 2003/0186042 A1 | 10/2003 | Dunlap et al. | |
| 2004/0191064 A1 * | 9/2004 | Guo | 416/191 |
| 2005/0278933 A1 | 12/2005 | Macke, Jr. et al. | |
| 2006/0078455 A1 | 4/2006 | Troitski et al. | |
| 2006/0236544 A1 | 10/2006 | Huskamp et al. | |

FOREIGN PATENT DOCUMENTS

| | | |
|---|---|---|
| EP | 1151849 A1 | 7/2001 |
| EP | 1384565 A1 | 1/2004 |
| WO | 2004022319 A1 | 3/2004 |

OTHER PUBLICATIONS

International Search Report and Written Opinion of PCT/US2008/058359; Feb. 19, 2009; 13 pages.
International Search Report of PCT/US2008/058290; Sep. 30, 2008; 11 pages.

* cited by examiner

*Primary Examiner* — Sang Y Paik
(74) *Attorney, Agent, or Firm* — Armstrong Teasdale LLP

(57) ABSTRACT

A system of interconnecting structures fabricated utilizing an additive manufacturing process is described. The system includes a first component comprising a first unit of an interconnection mechanism, and a second component comprising a second unit of an interconnection mechanism. The first component and first unit are integrally formed utilizing the additive manufacturing process as are the second component and the second unit. The first unit and the second unit are operable to engage one another to attach the first component to the second component.

13 Claims, 16 Drawing Sheets

Section A-A

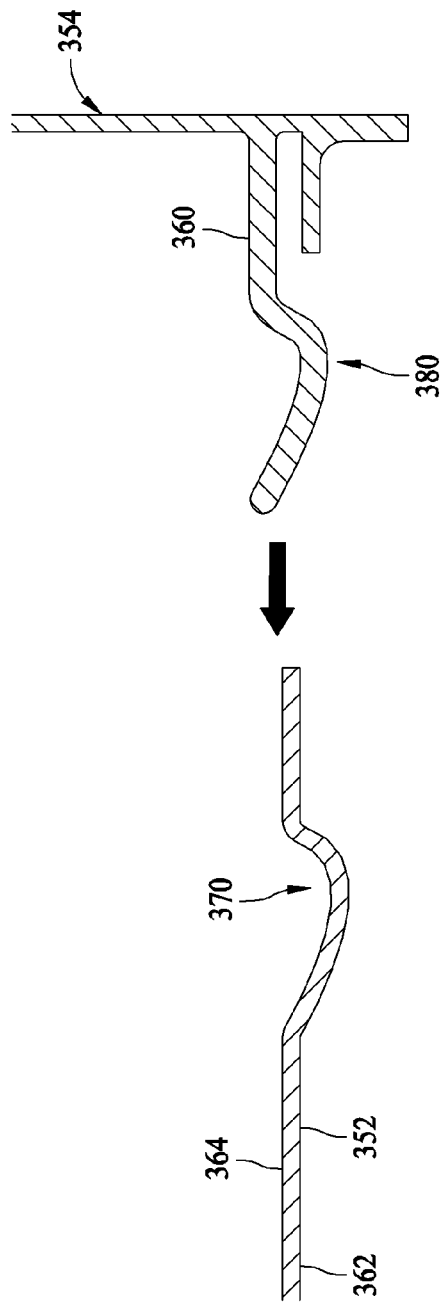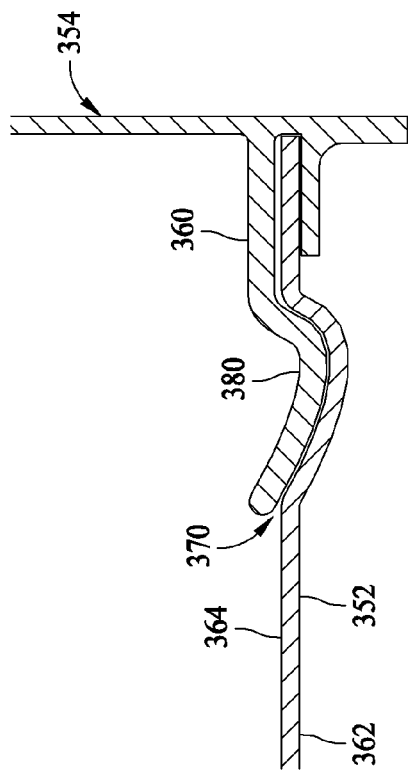
FIG. 18
FIG. 19

METHODS AND SYSTEMS FOR PROVIDING DIRECT MANUFACTURED INTERCONNECTING ASSEMBLIES

BACKGROUND OF THE INVENTION

This invention relates generally to manufacturing of composite structures, and more specifically, to methods and systems for providing direct manufactured interconnecting assemblies.

Direct manufactured components, or parts, are polymer parts that have been cured, for example, by laser sintering uncured polymer powder in a chamber. Such components are commonly referred to and utilized as rapid prototype parts. However in a manufacturing environment such as those associated with aircraft applications, direct manufactured components are to be utilized as fly-away production parts and not temporary prototypes. Direct manufactured components are fabricated in chambers of various sizes. When the size of a particular component exceeds the chamber capacity in which to build a contiguous part, secondarily attached joints and interconnects are utilized so that the discrete component parts can be subsequently attached together thereby fabricating the larger assembly.

An example of secondarily attached joints and interconnects includes aircraft structures that contain removable doors or interconnected panels. Such structures typically have mating latch mechanisms that are bonded or fastened to the structures. However, secondary attaching operations increase manufacturing costs and increase part counts in an assembly. Further, these operations add process time for installation of the latching devices, and typically increase the overall weight of the structure.

In the case of components too large to manufacture within the chamber in a single direct manufacturing run, it is an option to permanently bond smaller direct manufactured parts together into a contiguous part using adhesives instead of, or in addition to, the latch mechanisms. However, use of adhesives introduces additional steps into a manufacturing process, and requires a longer process time, so the adhesives properly cure. Additionally, working with composite adhesives can be messy.

BRIEF DESCRIPTION OF THE INVENTION

In one aspect, a system of interconnecting structures fabricated utilizing an additive manufacturing process is provided. The system includes a first component comprising a first unit of an interconnection mechanism, and a second component comprising a second unit of an interconnection mechanism. The first component and first unit are integrally formed utilizing the additive manufacturing process as are the second component and the second unit. The first unit and the second unit are operable to engage one another to attach the first component to the second component.

In another aspect, a method for direct manufacturing a plurality of interconnecting components is provided. The method includes defining, for input into a direct manufacturing process, a configuration for a first component, the definition including parameters for at least one interconnection unit to be integrally formed with the first component; the at least one interconnection unit configured for interconnecting the first component to a second component, and integrally forming the first component including the at least one interconnection unit utilizing the direct manufacturing process. The method further includes defining, for input into the direct manufacturing process, a configuration for the second component, the definition including parameters for at least one receiving unit to be integrally formed with the second component, and integrally forming the second component including the at least one receiving unit utilizing the direct manufacturing process. The at least one interconnection unit is configured to engage the at least one receiving unit to maintain a position of the first component with respect to the second component.

BRIEF DESCRIPTION OF THE DRAWINGS

FIG. 18 illustrates the receiving pocket and clip tongue of FIG. 16 in cross-section.

FIG. 19 illustrates the receiving pocket and clip tongue of FIG. 16 in an engaged condition.

DETAILED DESCRIPTION OF THE INVENTION

As can be inferred from the above, it would be advantageous to interconnect various direct manufactured components together, without the use of adhesive and/or fasteners, to form larger assemblies. In specific instances, the non-use of adhesives would also allow the direct manufactured component parts to be disassembled as necessary. As described herein, direct manufacturing processes afford an opportunity to incorporate direct manufactured latching features, such as an interconnection unit and/or a mating receiving unit, into the various component parts that make up an assembly. In addition to reducing use of adhesives and/or fasteners, a cost reduction is realized by reduced part count and reduced or eliminated secondary assembly time. Weight savings may also be realized by the elimination of secondarily attached latching devices. As will be appreciated, the various embodiments described herein provide the above mentioned direct manufacturing latching features and can be incorporated into numerous direct manufactured assemblies and processes.

Figure 1:
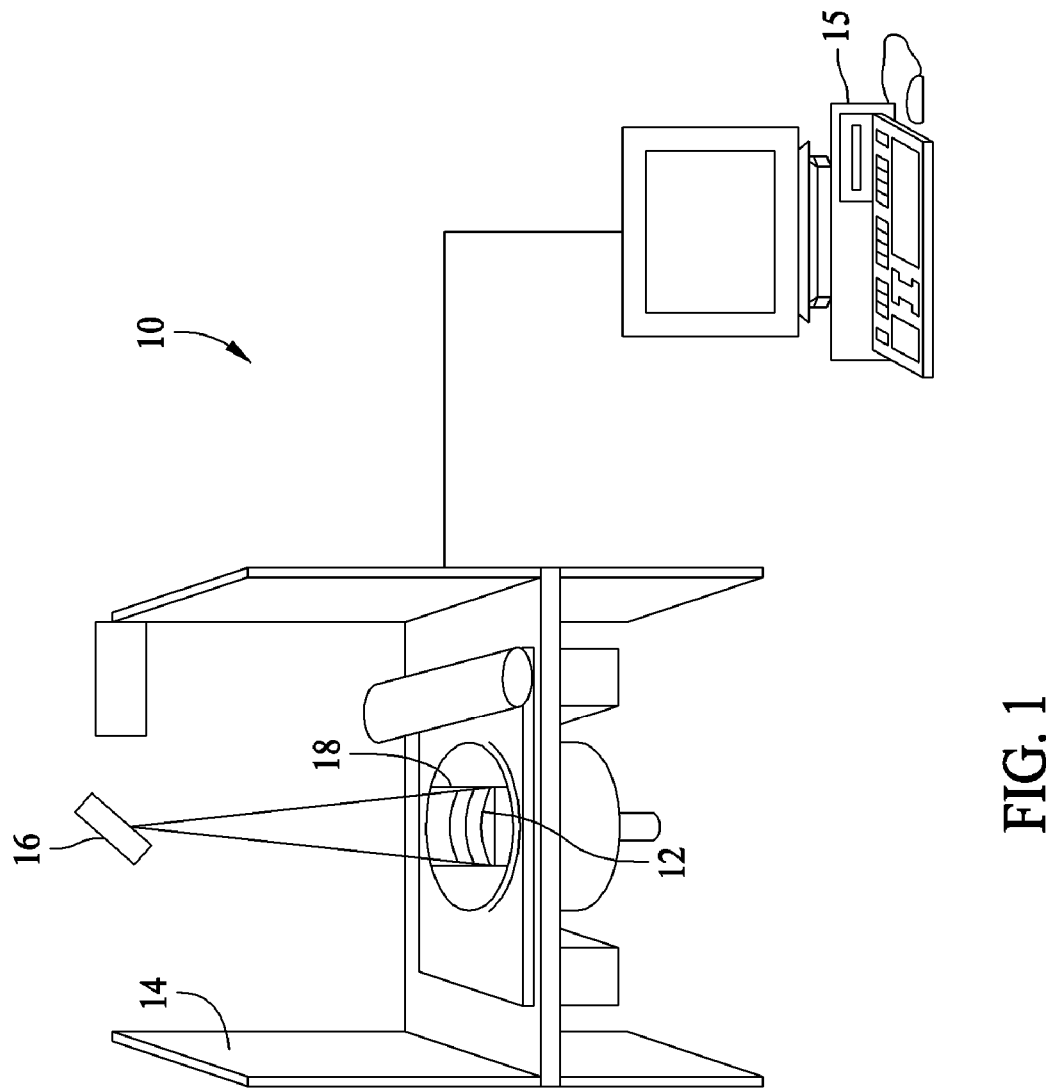
FIG. 1 is an illustration of a system utilized in the direct manufacture of composite structures.

FIG. 1 is an illustration of a system 10 utilized in the fabrication of structures 12 in accordance with the direct manufacturing methods described herein. In one embodiment, system 10 includes a direct manufacturing assembly 14, for example, a selective laser sintering assembly, to generate the desired structure (or structures) 12 in a single build run which is controlled utilizing a computer assembly 15. At least in the selective laser sintering example, direct manufacturing assembly 14 incorporates a laser 16 to integrally fabricate solid structures within a build chamber 18 during the build run.

Selective laser sintering (SLS) is a process for generating a material from a powdered sintering compound, and is one type of direct manufacturing process. In the SLS process, the powdered compound is distributed onto a surface within build chamber 18, and laser 16, is directed onto at least a portion of the powder, fusing those powder particles together to form a portion of a sintered material. Successive layers of the powder are distributed onto the surface, and the laser sintering process continues, fusing both the particles of the powdered material together into layers and the adjacent layers together, until the fused layers of laser sintered material are of a shape and thickness as appropriate for the intended use of the material.

Through laser sintering of polymer materials, integral internal features may be incorporated into structures, such as various embodiments of latching devices, several of which are described below. These direct manufactured latching devices may be referred to in combination as an interconnection mechanism and generally include a first unit integrally formed as part of a first component of the structure and a second unit integrally formed as part of a second component of the structure. The first unit and the second unit are configured to engage one another to maintain the relative position of the components with respect to one another. The first and second unit may also be referred to as interconnection and receiving units. Although laser sintering is utilized in describing the embodiments, other layer and/or additive build methodologies are also contemplated.

Figure 2:
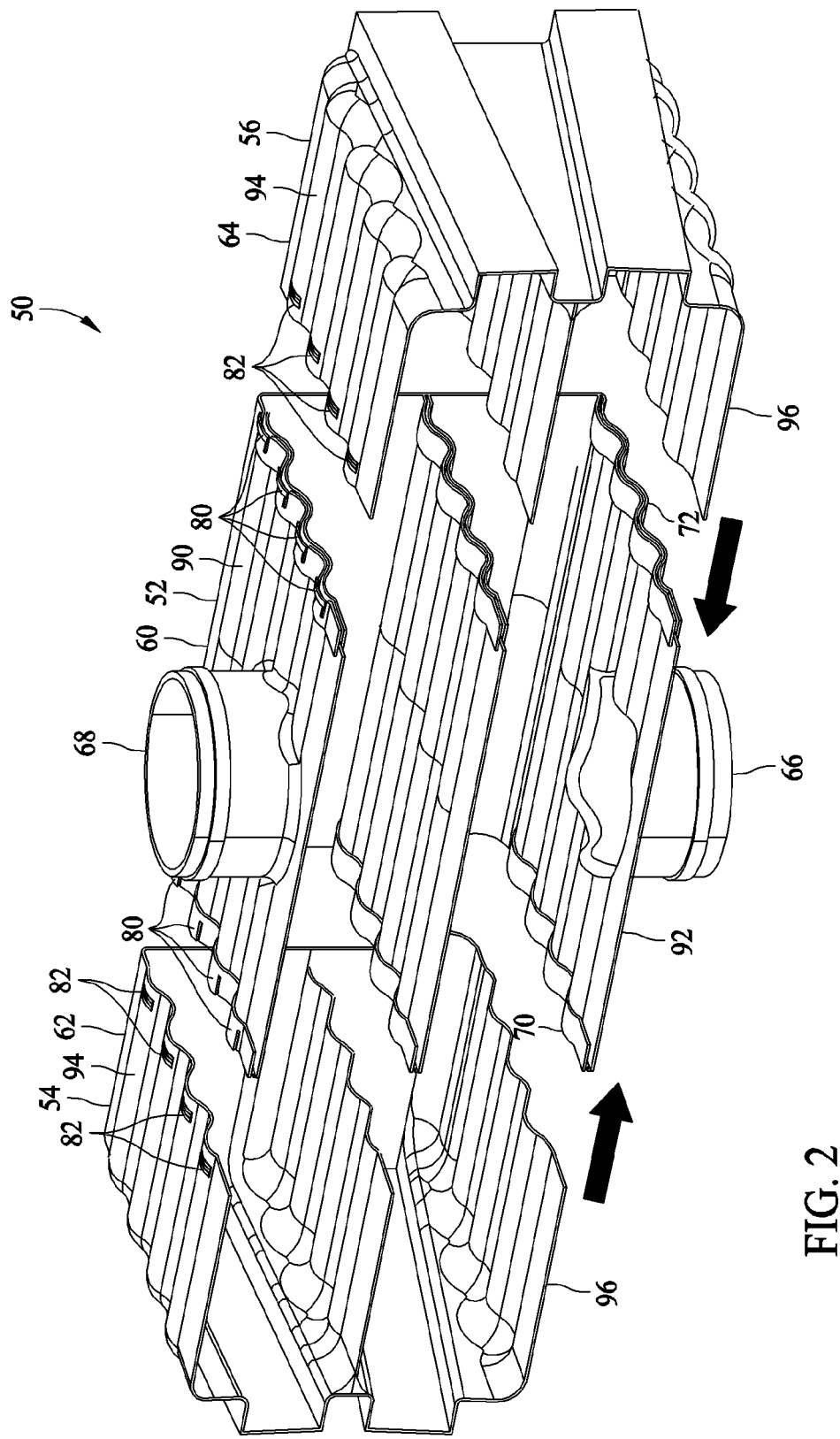
FIG. 2 is a cutaway view illustration of an assembly that is fabricated from three separate subassemblies that have been fabricated utilizing a direct manufacturing technology.

FIG. 2 is a cutaway view illustration of a direct manufactured assembly 50, or component, that is fabricated from three separate subassemblies 52, 54, and 56 that have been fabricated utilizing a direct manufacturing technology, for example, selective laser sintering (SLS). In the illustrated embodiment, assembly 50 is a three piece air handling plenum and the subassemblies 52, 54, and 56 are respectively referred to as a center section 60, a first end section 62, and a second end section 64. Center section 60 includes an air inlet 66 and an air outlet 68. As is also shown in the illustration of FIG. 1, first end section 62 is fabricated such that its components engage similarly shaped components at a first side portion 70 of center section 60. Similarly, second end section 64 is fabricated such that its components engage similarly shaped components at a second side portion 72 of center section 60.

As further illustrated in subsequent figures, center section 60, first end section 62, and second end section 64 are fabricated to include, respectively, one or more external snap latches 80 configured to interface with one or more of a plurality of engaging protrusions 82 formed as a part of the mating subassemblies. In the air handling plenum of FIG. 1, external snap latches 80 are direct manufactured at both side portions 70, 72 of center section 60, both on a top panel 90 and a bottom panel 92 (external snap latches 80 on bottom panel 92 not shown) of the plenum, and located such that they are accessible when the assembly 50 is assembled. Similarly, engaging protrusions 82 are formed both on top panels 94 and bottom panels 96 of both the first end section 62 and the second end section 64. As further explained herein, as the subassemblies 52, 54, and 56 are placed in engagement with one another, external snap latches 80 engage the engaging protrusions 82 to maintain the positions of the first and second end sections 62 and 64 with respect to the center section 60. External snap latches 80 and engaging protrusions 82 may be collectively referred to as an external interconnect splice joint.

Figure 3:
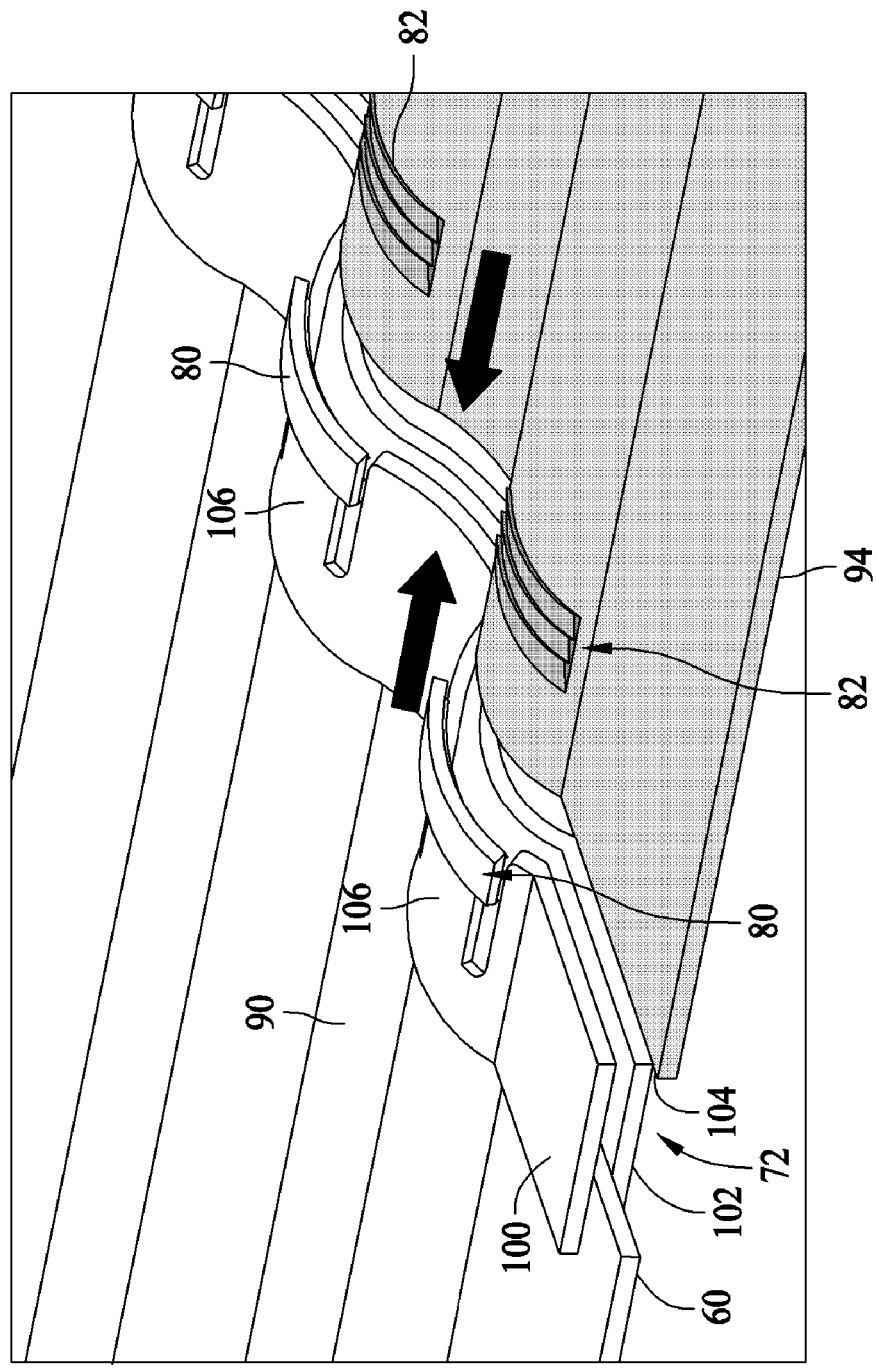
FIG. 3 is a more detailed view of external snap latches and engaging protrusions in the assembly of FIG. 2.

FIG. 3 is a more detailed view of the external snap latches 80 and engaging protrusions 82 and respective panels 90 and 94 described above with respect to FIG. 2. As can be seen in FIG. 3, the second side portion 72 of center section 60 is fabricated to include a sleeve, including an upper flange 100 and a lower flange 102 between which an edge 104 of second end section 64 is inserted. When oriented correctly, the external snap latches 80, which extend from and form a portion of upper flange 100, align with the engaging protrusions 82, and when edge 104 of second end section 64 is inserted between upper member 100 and lower member 102, the external snap latches 80 will engage engaging protrusions 82. Both external snap latches 80 and engaging protrusions 82 are disposed in a spaced relationship along mating edges of the subassemblies 52, 54, and 56 as appropriate for fabrication of assembly 50. As seen in FIG. 3, only an end 106 of external snap latch 80 engages the remainder of flange 100, allowing for flexure of external snap latch 80, when engaging, or disengaging, protrusions 82.

Figure 4:
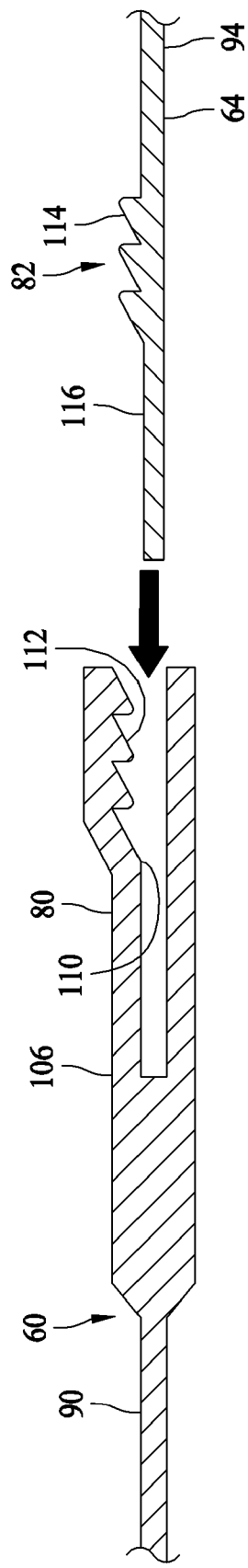
FIG. 4 is a cross-sectional view illustrating the relationship between the external snap latches and the engaging protrusions shown in detail in FIG. 3.

FIG. 4 is a cross-sectional view further illustrating the relationship between the external snap latches 80 and the engaging protrusions 82. In the illustrated embodiment, an underside 110 of external snap latch 80 is configured to include integral female saw tooth grooves 112 that that are shaped to engage the adjoining panel of second end section 64, specifically to engage engaging protrusions 82. In the illustrated embodiment engaging protrusions 82 are male saw tooth protrusions 114 formed on an upper surface 116 of second end section 64.

Figure 6:
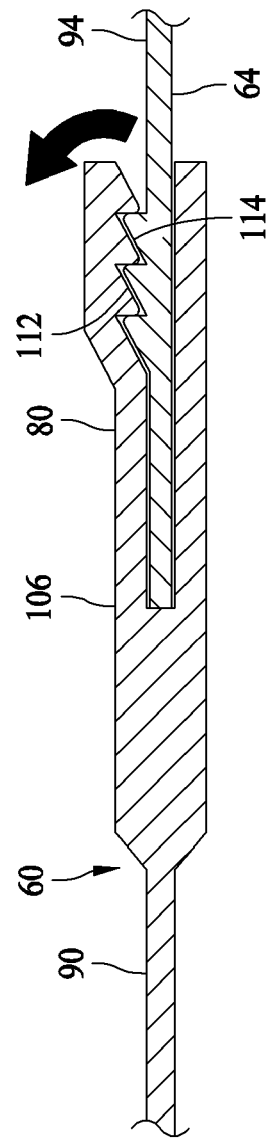
FIG. 6 is a cross-sectional view of the engagement illustrated in FIG. 5.
Figure 5:
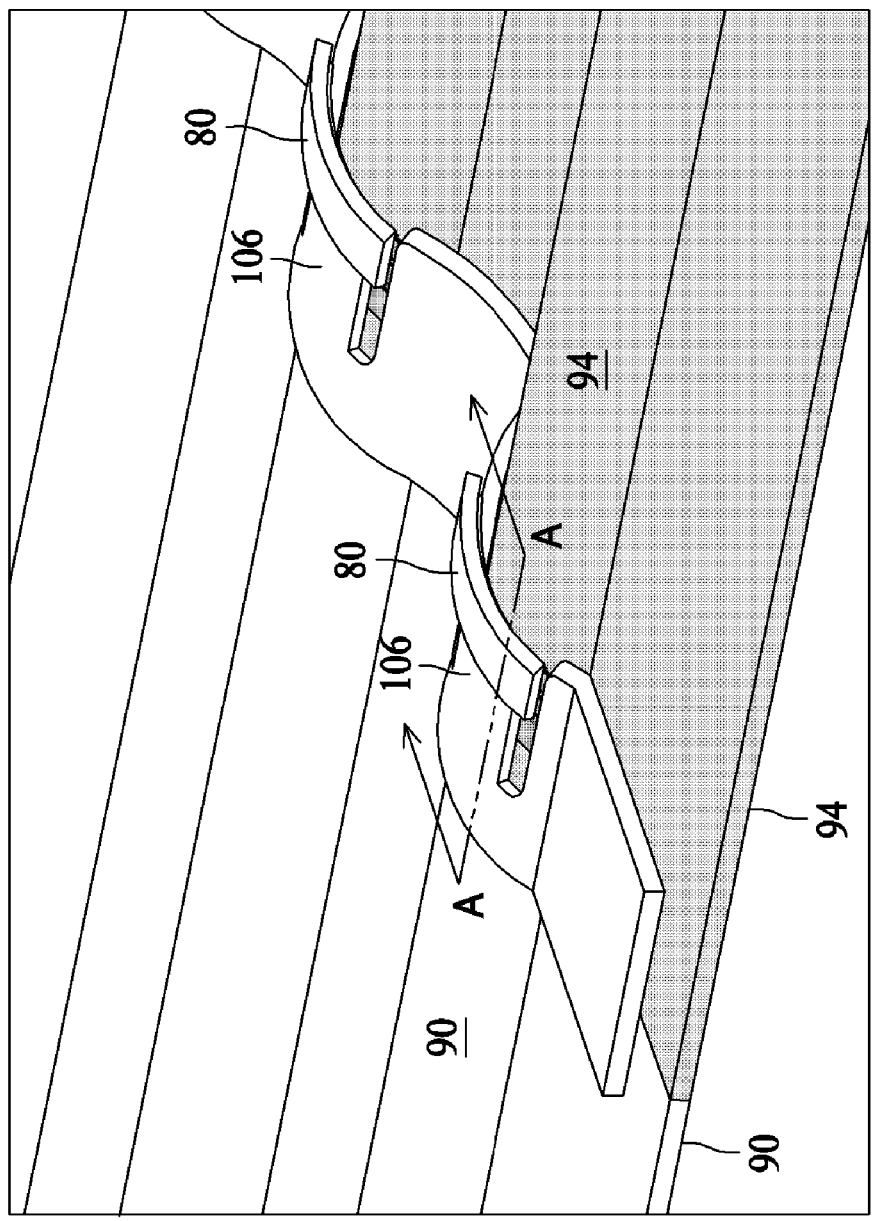
FIG. 5 is an illustration of two panels of the assembly of FIG. 2 engaged with one another.

FIG. 5 is an illustration of panels 90 and 94 engaged with one another and FIG. 6 is a cross-sectional view of the engagement illustrated in FIG. 5. In FIG. 6, the engagement between the integral female saw tooth grooves 112 and the male saw tooth protrusions 114 is easily discerned. To describe generally the embodiments illustrated and described with respect to FIGS. 3-6, an external snap latch 80 on one panel 90 includes integral female saw tooth grooves 112 that mate with and engage an adjoining panel 94 which has opposing male saw tooth protrusions 112. When installed, the snap latch 80 bends pivotably upwards from panel 90 and over each saw tooth until full engagement is achieved. Once installed, the snap latch 80 prevents removal of these mated parts unless the snap latch 80 is manually lifted, as shown by the arrow in FIG. 6, to disengage the saw tooth interconnection.

While FIGS. 3-6 describe individual components and their interaction with one another with respect to panels 90 and 94, it is to be understood that the components and interactions are representative of any external interconnect splice joint incorporated into assembly 50 or other like devices that are fabricated from multiple direct manufactured sub-assemblies.

With regard to SLS, fabrication of the air plenum, and all embodiments described herein, may be fabricated through successive layers being "sintered" together. Assuming, for example, the center section 60 is fabricated from the bottom up, the sintering compound would be distributed across the build chamber then fused by the laser in a circular pattern within build chamber 18 (shown in FIG. 1). The distribution of sintering compound and successive sintering of the layers continues until air inlet 66 is completely formed. As air inlet 66 is completed, the sintering compound is fused in a pattern to begin fabrication of the corrugated portions of panel 92 and external snap latches 80 to be formed on the underside of panel 92 and so on until the panel 92 and external snap latches 80 are complete. The process continues and successive layers are built up (that eventually form side walls, the center corrugated section, panel 90 (and external snap latches 80) and air outlet 68 until fabrication of the center section 60 is complete. It should be noted that center section 60 could be fabricated in any "direction" including from top to bottom, from front to back, or from back to front, depending on the dimensions of center section 60 and the dimensions of build chamber 18.

Figure 7:
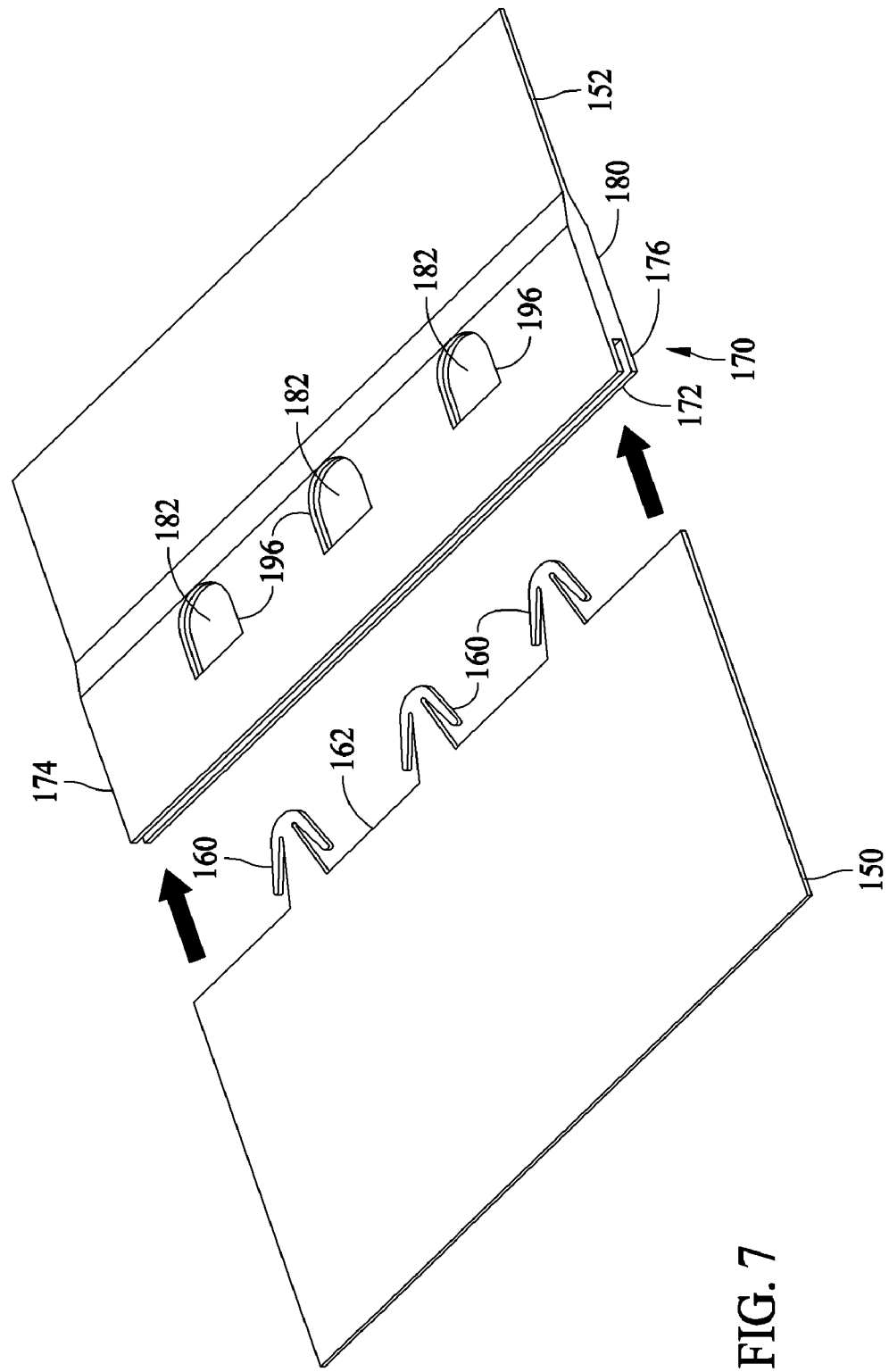
FIG. 7 is an illustration of two direct manufactured panels which connect with one another utilizing integrally fabricated, internal interconnect splice joints.

FIG. 7 is an illustration of two direct manufactured panels 150 and 152 which include a plurality of internal interconnect splice joints. Components of the splice joints are integrally fabricated with the respective panel during the direct manufacturing process, for example, the above described selective laser sintering process. Referring specifically to the panel 150, a plurality of barbed posts 160 extend from a interconnecting edge 162, or side of panel 150.

Panel 152 is direct manufactured to include a sleeve 170 along its interconnecting edge 172 which includes an upper flange 174 and lower flange 176 between which the barbed posts 160 are inserted when connecting panels 150 and 152 are attached to one another. As can be seen in the illustration, upper flange 174 and lower flange 176 form a groove into which barbed posts 160 and a portion of panel 150 are inserted. A thickened area 180 of panel 152 is interior of a line where flanges 174 and 176 come together. Within this thickened area 180, and as further illustrated in FIGS. 8 and 9, female pockets 182 are formed into which the barbed posts 160 are inserted, both being disposed in a spaced relationship along the respective mating edges of panels 150 and 152.

An internal latching interconnecting between panels 150 and 152 is achieved when barbed posts 160 of panel 150 are inserted into the corresponding female pocket 182 on an adjoining panel 152. Now referring to FIG. 8, the female pockets 182 include two ledges 184 resulting in a rectangular slot 186 therebetween that provides access to the female pocket 182. The rectangular slot 186 is smaller in width than barbs 190 that extend from the barbed posts 160. When the barbs 190 are passed through rectangular slot 186 and into the pocket 182, the barbs 190 collapse enough to pass between the ledges 184. The barbs 190 then return to their original shape and size such that they engage a surface 192 of the ledges 184 to prevent disassembly of the mated panels 150 and 152.

Figure 8:
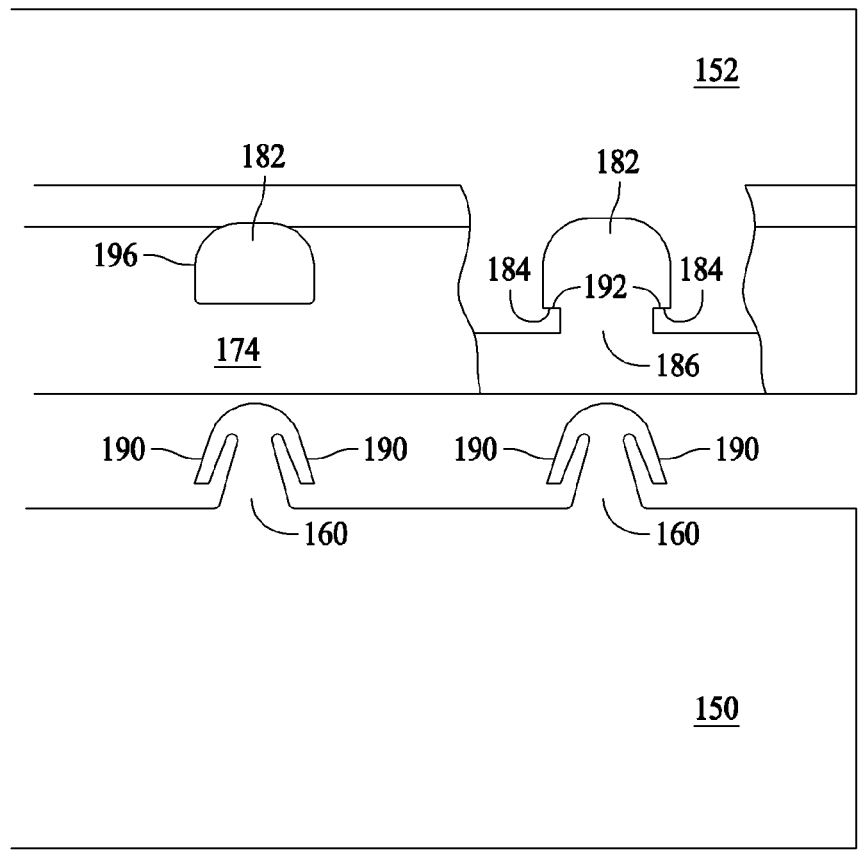
FIG. 8 is an illustration of a panel be configured with one or more openings that providing access to barbed posts of the splice joint of FIG. 7.

As shown in FIG. 8, panel 152 may be configured with one or more openings 196 (also shown in FIG. 7) that provide access to barbed posts 160 within the female pockets 182, allowing a user to disconnect panel 150 from 152 through compression of barbs 190 to the point where the barbed posts 160 will disengage from ledges 184 and pass in an opposite direction through the rectangular opening 186. A portion of the upper flange 174 has been removed from the illustration of FIG. 8 to better illustrate the structure of female pocket 182.

Figure 9:
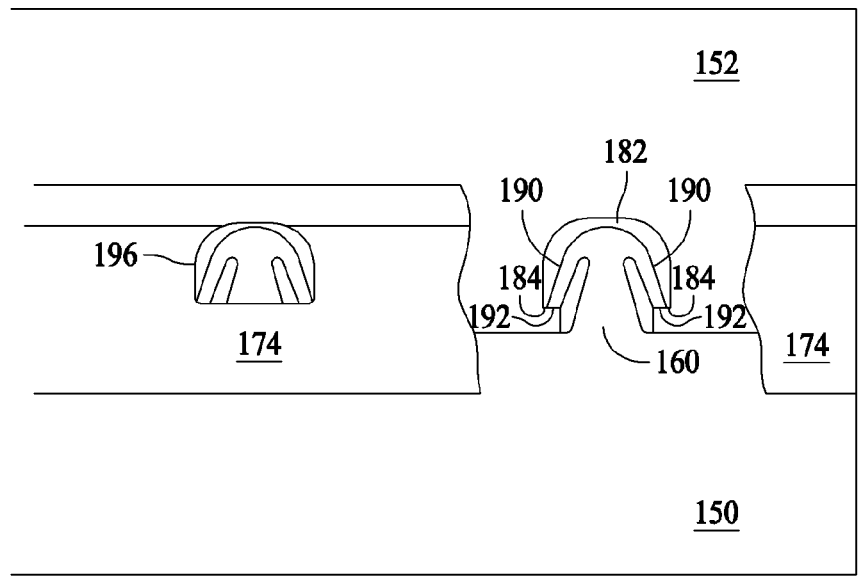
FIG. 9 illustrates the interaction between barbed posts and a female pocket when two panels are interconnected.

FIG. 9 illustrates the interaction between barbed posts 160 and the female pocket 182 when panels 150 and 152 are interconnected. A portion of the upper flange 174 has been removed from the illustration of FIG. 9 to better illustrate the above described interaction between the barbed posts 160 and the female pocket 182. Specifically, an engagement between the barbs 190 of the posts 160 and the surface 192 of the ledges 184 of pocket 182 is shown.

Figure 10:
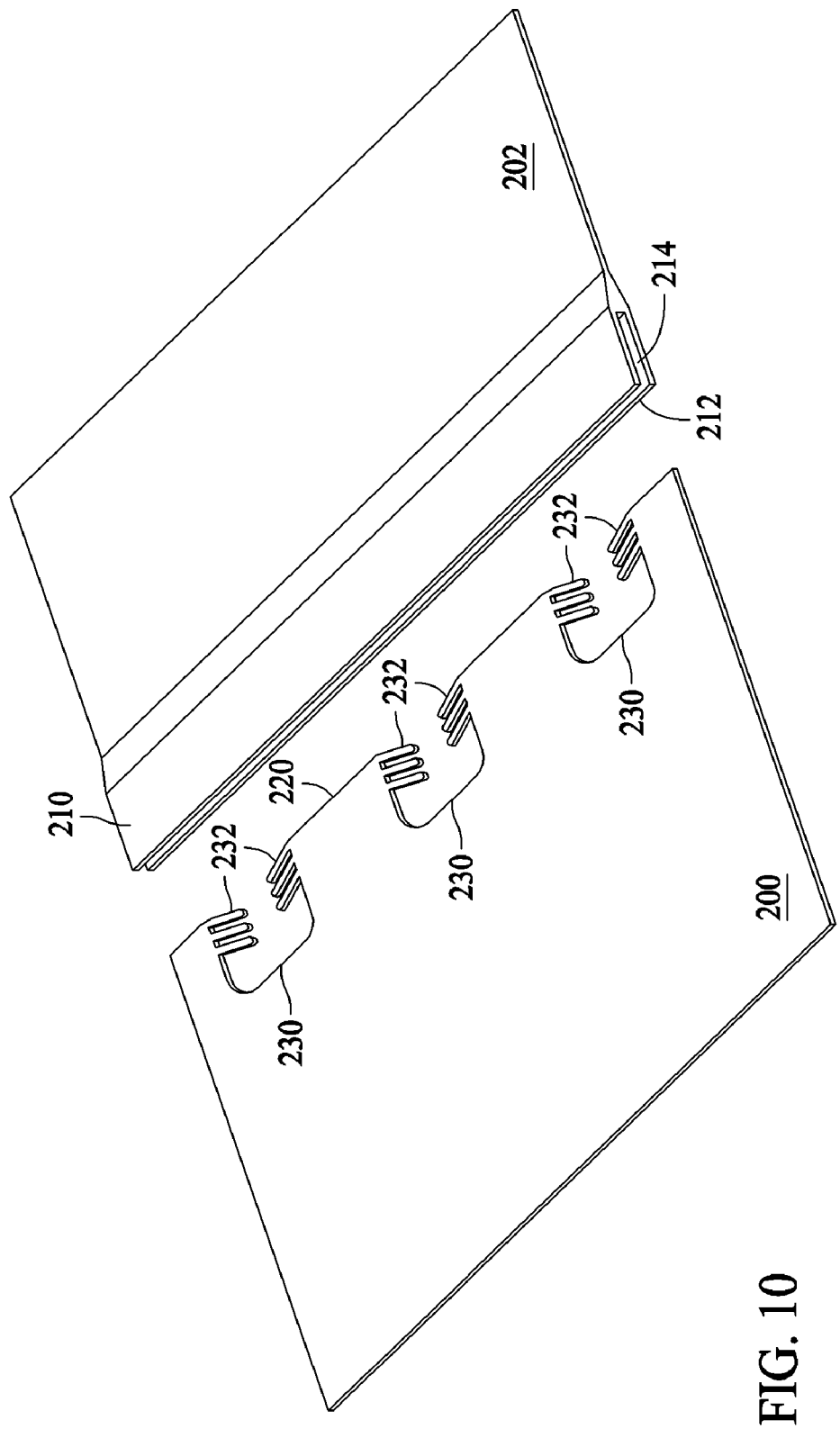
FIG. 10 is an illustration of two direct manufactured panels incorporating a substantially permanent direct manufactured interconnection.

FIG. 10 is an illustration of two direct manufactured panels 200 and 202, which can be attached to one another utilizing an interconnecting splice joint that is configured to be substantially permanent. Panel 202 includes an upper flange 210 and a lower flange 212 forming a groove 214 into which an interconnecting side 220 of panel 200 is inserted, the combination similar to a tongue and groove arrangement. The interconnecting side 220, which is sometimes referred to as a tongue portion, is configured with a plurality of receiving slots 230 having inwardly facing fingers 232 that are operable to engage a suitably shaped protrusion 240, shown in FIG. 11, the protrusion 240 integral to the groove 214 formed as a portion of panel 202.

Figure 11:
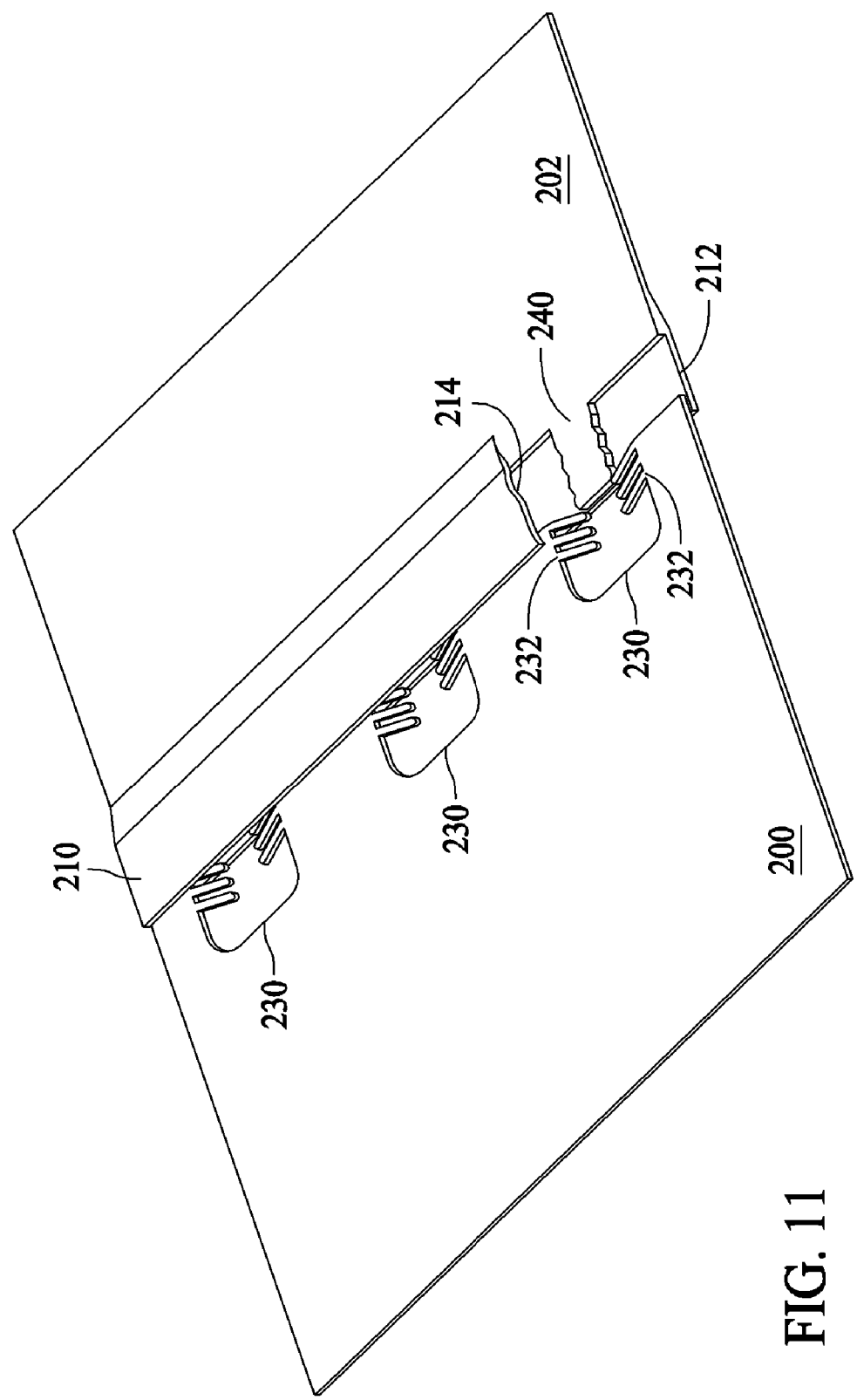
FIG. 11 is an illustration of the panels of FIG. 10 with a portion of upper flange removed to illustrate an interaction between direct manufactured interconnecting devices.

FIG. 11 is an illustration of panels 200 and 202 beginning to engage one another, with a portion of upper flange 210 removed to illustrate an interaction between fingers 232 of panel 200 and protrusion 240 of panel 202. As described above, protrusions 240 are located within the groove 214 between upper flange 210 and lower flange 212. Both protrusions 240 and receiving slots 230 (including fingers 232) are disposed in a spaced relationship along mating edges of panels 200 and 202.

Figure 12:
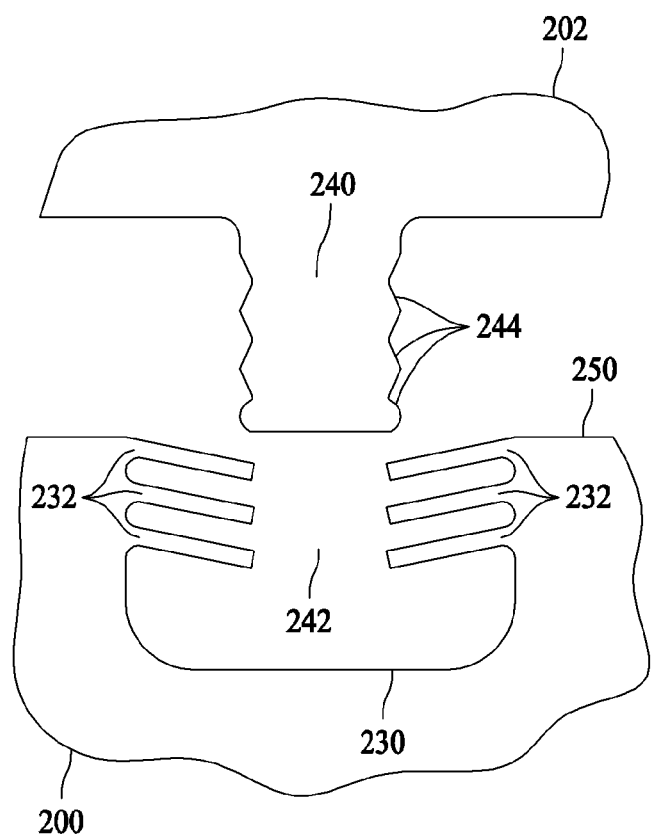
FIG. 12 is a detailed illustration of the components of a substantially permanent direct manufactured interconnection.
Figure 13:
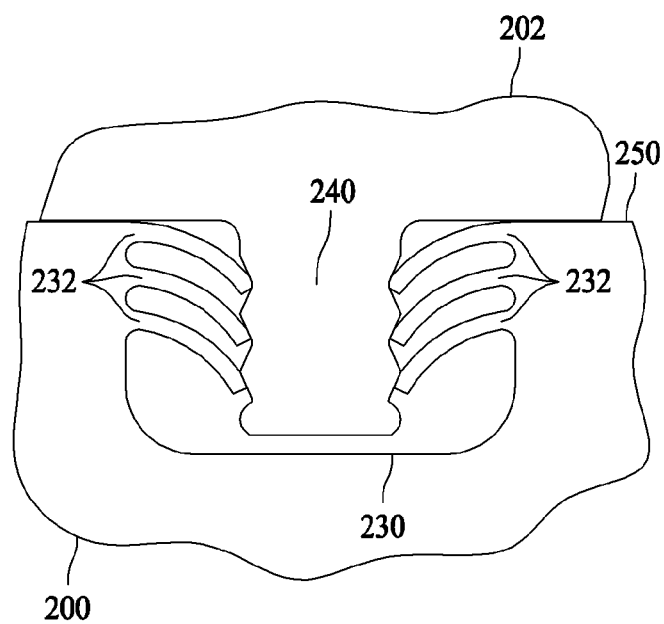
FIG. 13 is an illustration of the components of FIG. 12 in an interconnected condition.

The inwardly facing fingers 232 extend from both sides of the receiving slot 230 with a gap 242 between the finger sets of each receiving slot 230 being smaller than a width of protrusion 240 within the groove 214. In one embodiment, and now referring to FIGS. 12 and 13, protrusion 240 includes ridges 244 configured to interface with and engage the fingers 232 in the receiving slot 230 as the tongue portion 220 of panel 200 is inserted into the groove of panel 202. More specifically, and as illustrated in FIGS. 12 and 13, when protrusion 240 is inserted into the receiving slot 230, the fingers 232 flex inward and snap over the ridges 244 on the protrusion 240. As best shown in FIG. 12, the fingers 232 face slightly inward from the edge 250 of panel 200 to readily receive the protrusion 240 of the opposing panel 202. Now referring to FIG. 13, when fingers 232 and ridges 244 engage one another, the individual fingers 232 that have snapped behind individual ridges 244 on the protrusion 240 are unable to flex in the reverse direction. Such a configuration results in a substantially permanent interconnection between panels 200 and 202.

FIGS. 14-23 illustrate various embodiments of direct manufactured structures and removable panels that each incorporate retaining devices, for example, retaining clips, receiving pocket, detents, clip tabs, clip arms, tongue clips, and the like that are fabricated as a part of the respective structure or panel using a direct manufacturing, sometimes referred to as additive manufacturing, process such as selective laser sintering.

Figure 14:
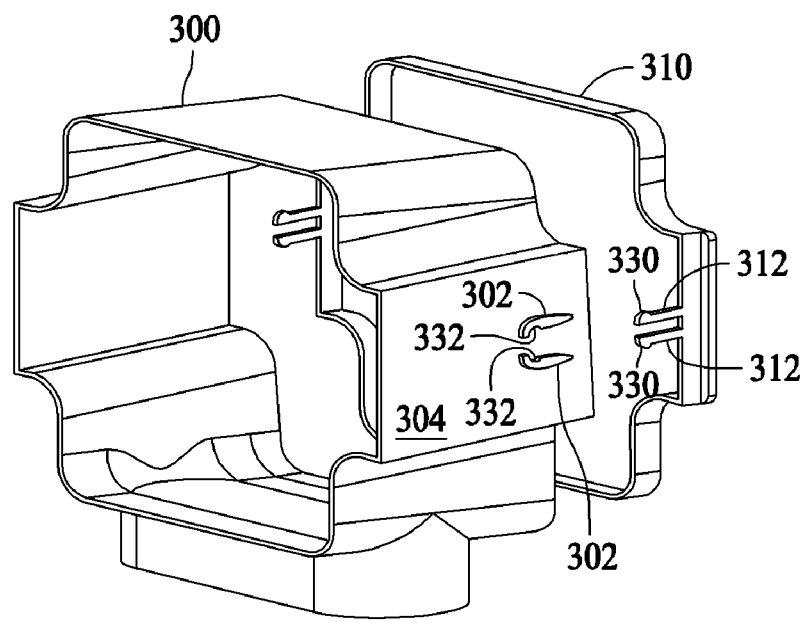
FIG. 14 is an illustration of a direct manufactured structure configured with integrally formed receiving pockets and a direct manufactured removable panel having integrally formed clip tabs.
Figure 15:
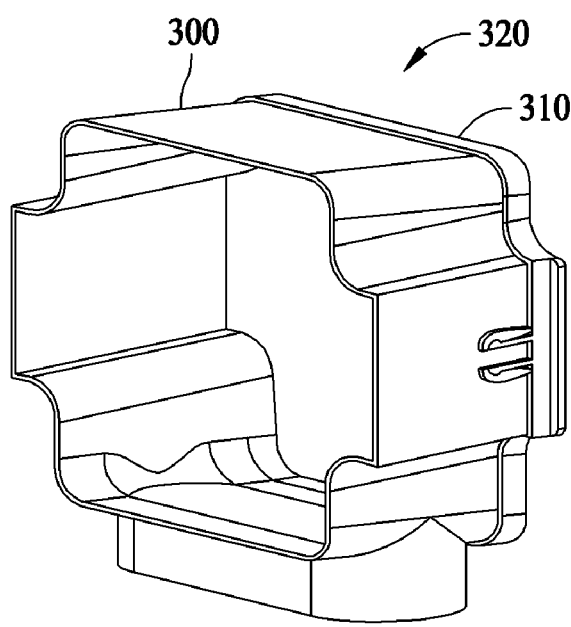
FIG. 15 is an illustration of the structure and panel of FIG. 14 in an interconnected condition.
Figure 16:
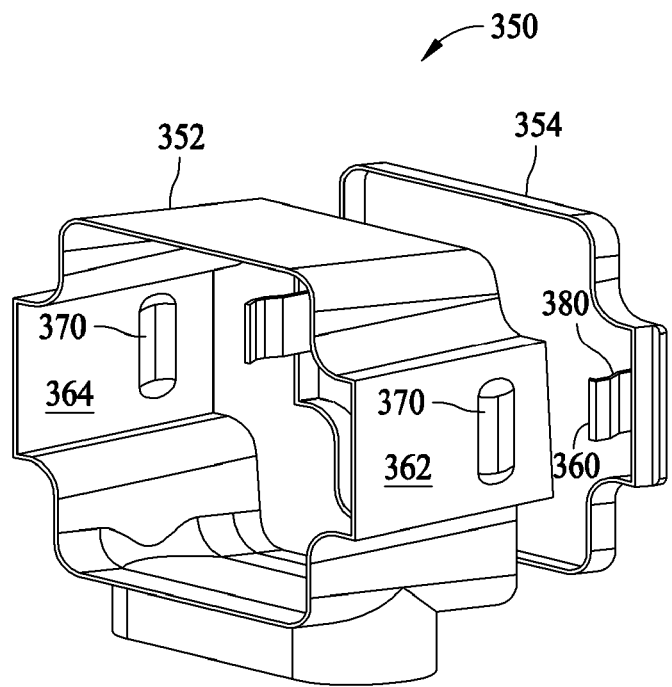
FIG. 16 is an illustration of a direct manufactured structure configured with integrally formed receiving pockets and a direct manufactured removable panel having integrally formed clip tongues.
Figure 17:
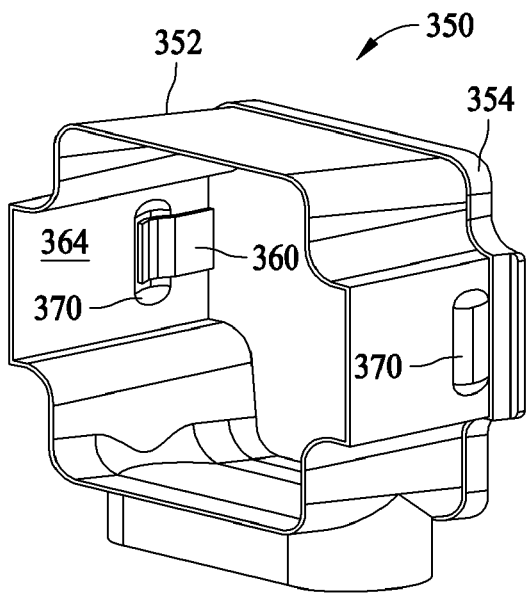
FIG. 17 is an illustration of the structure and panel of FIG. 16 in an interconnected condition.
Figure 20:
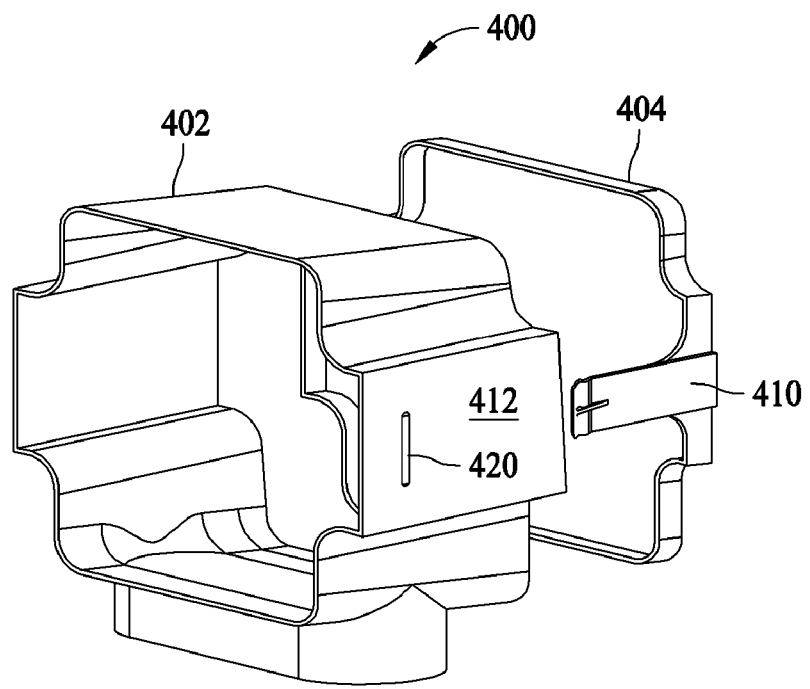
FIG. 20 is an illustration of a direct manufactured structure configured with integrally formed detent on an outer surface and a direct manufactured removable panel having integrally formed clip tongues.
Figure 21:
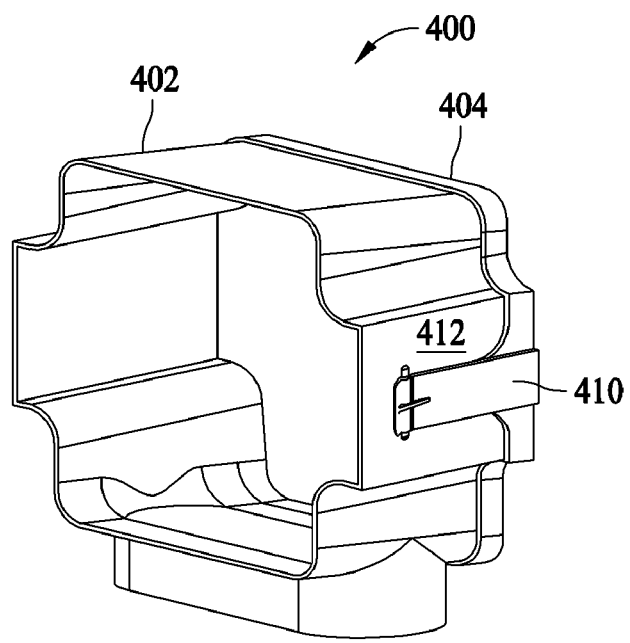
FIG. 21 is an illustration of the structure and panel of FIG. 20 in an interconnected condition.

More specifically, FIG. 14 is an illustration of a direct manufactured structure 300, for example, a portion of an air plenum that is configured to include opposing receiving pockets 302 formed on an outer surface 304 thereof. It should be noted that the outer surface 304 may be configured with multiple pairs of receiving pockets 302, depending on a configuration of a removable panel 310, that is configured to be attached to the structure 300. Removable panel 310 includes, in the illustrated embodiment, a plurality of opposing clip tabs 312 extending therefrom that are configured to engage respective receiving pockets 302 on structure 300, thereby operating to retain removable panel 310 in an engaged position with respect to structure 300 thereby forming an assembly 320, as shown in FIG. 15. The particular shapes and functions for structure 300 and panel 310 may vary greatly while still incorporating the respective receiving pockets 302 and clip tabs 312.

Retaining clip tabs 312 are formed integrally with the cover panel (removable panel 310) of assembly 320. As illustrated, clip tabs 312 are suitably shaped with an enlarged rounded, or bulbous end 330 which compresses slightly to engage receiving pocket 302 and eventually expand into a corresponding shape (round pocket 332) of receiving pocket 302. In the illustrated embodiment, clip tabs 312 are paired, with the bulbous end 330 of each tab 312 extending in a direction opposite one another. To engage the oppositely oriented tabs 312, each respective receiving pocket 302 is also oppositely oriented. Clips 312 and receiving pockets 302 are collectively referred to herein as a retention mechanism.

FIGS. 16-19 illustrate a similar assembly 350, including a direct manufactured structure 352 and a direct manufactured removable panel 354 that incorporate an alternative embodiment of retention mechanism. In the embodiment, clip tongues 360 are direct manufactured as a part of (e.g., formed integrally) with the removable panel 354 of assembly 350. Rather than engage a formation on outer surface 362 of structure 352, clip tongues 360 are configured to depress slightly enabling them to slide along an interior surface 364 of structure 352 and eventually expand into an indentation 370 formed in the interior surface 364. Indentations 370 are suitably shaped to capture and retain the clip tongues 360 of the removable panel 354. In the illustrated embodiment, indentations 370 are substantially rectangular in shape, and clip tongues 360 are formed to include a protruding member 380 that is shaped to fit into an indentation 370. FIG. 18 is a cross-sectional view of structure 352 and removable panel 354 generally illustrating the shape of clip tongue 360 and indentation 370. FIG. 19 is also a cross-section of structure 352 and removable panel 354 illustrating the engagement between clip tongue 360 and indentation 370 when removable panel 354 is attached to structure 352.

FIGS. 20-23 illustrate embodiments of an assembly 400, that includes a direct manufactured structure 402 and a direct manufactured removable panel 404 that incorporate other alternative embodiments of retention mechanisms. In the embodiments, clip tongues 410 are direct manufactured as a part of (e.g., formed integrally) with the removable panel 404 of assembly 400. Clip tongues 410 engage a formation on an exterior surface 412 of structure 402. More specifically, clip tongues 410 are configured to slide along an exterior surface 412 of structure 402 and widen, or extend, slightly enabling them to engage raised detents 420 formed on the exterior surface 412 then compress as the engagement with the detent 420 occurs. More specifically, the detents 420 are suitably shaped to capture and retain a mating formation formed as a part of the clip tongues 410 of the removable panel 404.

Figure 22:
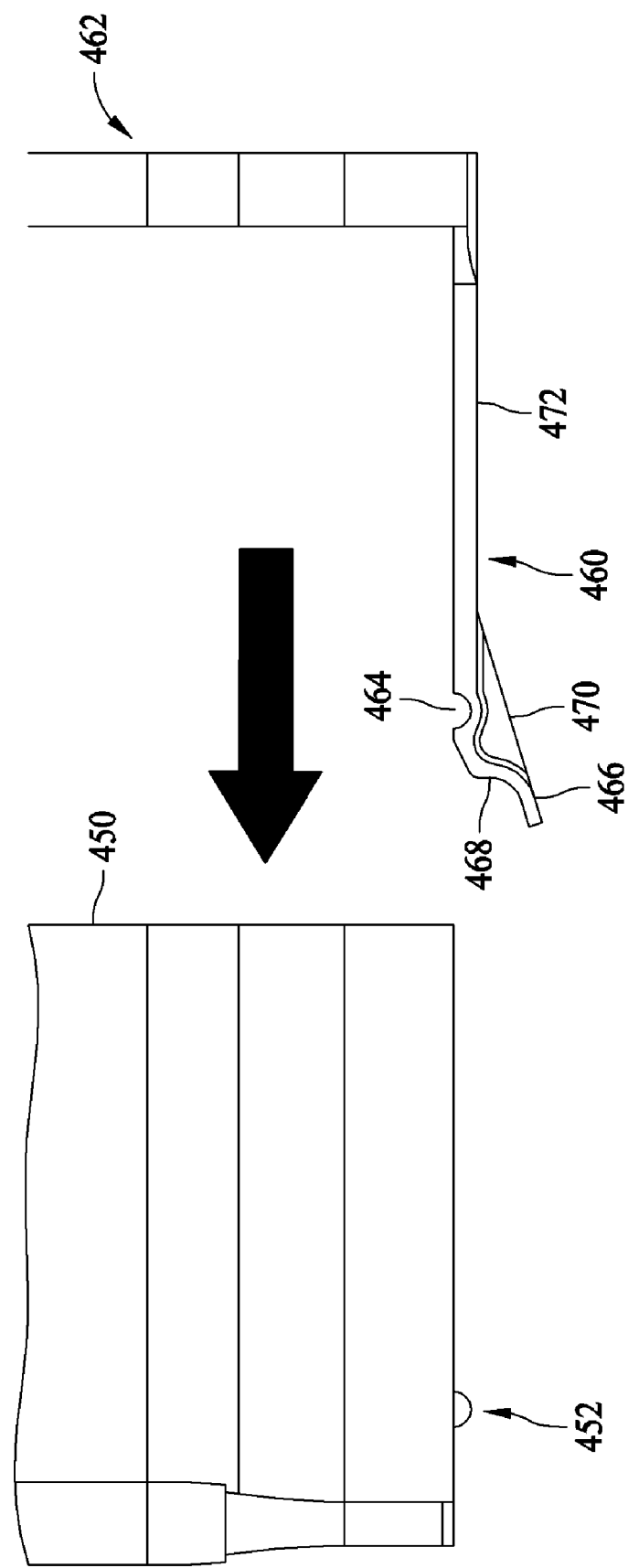
FIG. 22 illustrates the detent and clip tongue of FIG. 20 in detail.

In the embodiment illustrated in FIG. 22, structure 450 includes a detent 452 that is substantially semi-circular in cross-section and the clip arm 460 of removable panel 462 includes a semi-circular pocket 464 formed therein and configured to engage detent 452. Clip arm 460 also includes a fingertip grab flange 466 at an end 468 of clip arm 460 opposite panel 462 that is utilized for disengaging panel 462 from structure 450. A stiffening member 470 may extend between end 468 and a main body 472 of clip arm 460 to provide strength.

Figure 23:
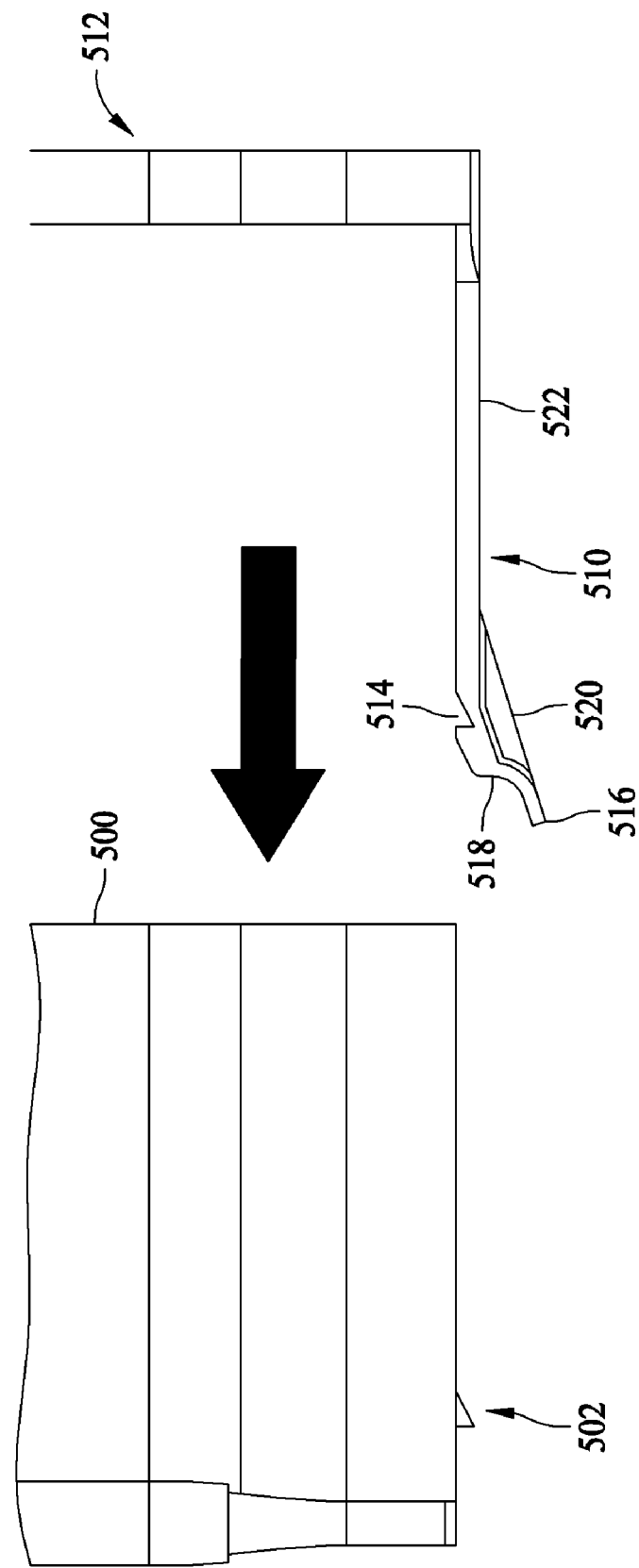
FIG. 23 illustrates the detent and clip tongue of FIG. 22 in an engaged condition.

In the embodiment illustrated in FIG. 23, structure 500 includes a detent 502 that is substantially an angled ramp (i.e., ramp-like or triangular) in cross-section and the clip arm 510 of removable panel 512 includes a substantially triangular pocket 514 formed therein and configured to engage detent 502. Clip arm 510 also includes a fingertip grab flange 516 at an end 518 of clip arm 510 opposite panel 512 that is utilized for disengaging panel 512 from structure 500. A stiffening member 520 may extend between end 518 and a main body 522 of clip arm 510 to provide strength.

In the embodiments of FIGS. 20-23, clip arms are integrally formed as part of the removable cover panels such that these arms extend over the mating structure to form an assembly. The ends of the clip arms contain a pocketing feature that engages with a correspondingly shaped protrusion in the mating structure. In the embodiment, either a semi-circular or an angled ramp detent cross-section is utilized that allows the respective clip arms to slide up and over the detent during installation and then be captured by the detent/pocket feature which prevents the arm from disengaging from the detent. In both embodiments, the clip arms are bent at the ends of the arms to provide a fingertip grab flange such that a fingertip can be inserted underneath to deflect the arm up and away from the mating structure thereby disengaging the capturing detent.

Though manufacturing of components of various assemblies utilizing selective laser sintering and other direct manufacturing techniques is described above with respect to center section 50 (shown for example in FIG. 2), it is to be understood that all components and assemblies described herein are capable of being manufactured utilizing the same and similar techniques. For example, when building a component that includes a detent, the distribution of sintering compound and successive sintering pattern is modified for those layers that have been defined to include a detent such that the detent is integrally manufactured as a portion of the component being fabricated. This description is applicable to those components described herein that include clip arms, receiving pockets, fingers, protrusions, etc. Such manufacturing techniques allows for interconnections between components to be made without adhesives or secondarily added fastening components, and further allows for components construction of devices that exceed the size capability of system 10.

While the invention has been described in terms of various specific embodiments, those skilled in the art will recognize that the invention can be practiced with modification within the spirit and scope of the claims.

What is claimed is:

1. A system of interconnecting structures fabricated utilizing an additive manufacturing process, said system comprising:
   a first component comprising an edge and a plurality of first units of an interconnection mechanism proximate said edge, said first component and said first units integrally formed utilizing the additive manufacturing process; and
   a second component comprising an edge and a plurality of second units of an interconnection mechanism proximate said edge, said second component and said second units integrally formed utilizing the additive manufacturing process, respective said first units and said second units operable to engage one another to attach said first component to said second component, said first and second units disposed in a spaced relationship along said edges of said first and second components for fabrication of said system.

2. A system according to claim 1 wherein the additive manufacturing process is a selective laser sintering process.

3. A system according to claim 1 wherein said first component and said second component comprise an aerospace structure.

4. A system according to claim 1 wherein said first unit and said second unit are releaseably engageable with one another.

5. A system according to claim 1 wherein said first component and said second component each comprise at least one panel, said first unit and said second unit integrally formed as a part of each respective said panel.

6. A system according to claim 1 wherein
   said edge of said first component comprises an upper flange and a lower flange, said second component edge configured for insertion between said upper and lower flanges, the insertion causing said first unit and said second unit to engage one another.

7. A system according to claim 6 wherein:
   said first unit comprises an external snap latch; and
   said second unit comprises a plurality of engaging protrusions, said external snap latch configured to engage said engaging protrusions to maintain a position of said first component with respect to said second component.

8. A system according to claim 7 wherein said external snap latch extends from and forms a portion of said upper flange.

9. A system according to claim 1 wherein:
   said first unit comprises a receptacle; and
   said second unit comprises a member that is releasably engageable within said receptacle to attach said first component to said second component.

10. A method for direct manufacturing a plurality of interconnecting components, said method comprising:
    defining, for input into a direct manufacturing process, a configuration for a first component, the definition including parameters for a plurality of interconnection units to be integrally formed with the first component, the interconnection units evenly spaced along an edge thereof, the plurality of interconnection units configured for interconnecting the first component to a second component;
    integrally forming the first component including the plurality of interconnection units utilizing the direct manufacturing process;
    defining, for input into the direct manufacturing process, a configuration for the second component, the definition including parameters for a plurality of receiving units to be integrally formed with the second component, the receiving units evenly spaced along an edge thereof; and
    integrally forming the second component including the plurality of receiving units utilizing the direct manufacturing process, where the plurality of interconnection units and the plurality of receiving units are disposed in a spaced relationship along the edges of the first and second components and respective interconnection unit are configuring to engage respective receiving units to maintain a position of the first component with respect to the second component.

11. A method according to claim 10 wherein integrally forming comprises utilizing a selective laser sintering process.

12. A method according to claim 10 wherein integrally forming the first component and integrally forming the second component comprise forming an aerospace structure.

13. A method according to claim 10 further comprising defining the at least one interconnection unit and the at least one receiving unit to be releaseably engageable with one another.

* * * * *